US 9,679,253 B2

(12) United States Patent
Gnocato et al.

(10) Patent No.: US 9,679,253 B2
(45) Date of Patent: Jun. 13, 2017

(54) METHODS FOR MAINTAINING INFRASTRUCTURE EQUIPMENT AND RELATED APPARATUS

(71) Applicant: Copperleaf Technologies Inc., Burnaby (CA)

(72) Inventors: Giuseppe Gnocato, Coquitlam (CA); Nicholas James Malcolm, Burnaby (CA); Stanley Thomas Coleman, North Vancouver (CA)

(73) Assignee: Copperleaf Technologies Inc., Burnaby (CA)

( * ) Notice: Subject to any disclaimer, the term of this patent is extended or adjusted under 35 U.S.C. 154(b) by 0 days.

(21) Appl. No.: 14/875,060

(22) Filed: Oct. 5, 2015

(65) Prior Publication Data
US 2016/0132550 A1 May 12, 2016

Related U.S. Application Data

(60) Provisional application No. 62/076,462, filed on Nov. 6, 2014.

(51) Int. Cl.
*G06Q 10/00* (2012.01)
*G06N 7/00* (2006.01)
(Continued)

(52) U.S. Cl.
CPC ............ *G06N 7/005* (2013.01); *G06Q 10/04* (2013.01); *G06Q 10/20* (2013.01); *G06Q 50/06* (2013.01)

(58) Field of Classification Search
None
See application file for complete search history.

(56) References Cited

U.S. PATENT DOCUMENTS

| 5,311,562 A | 5/1994 | Palusamy et al. |
| 5,434,775 A | 7/1995 | Sims et al. |

(Continued)

FOREIGN PATENT DOCUMENTS

| CA | 2216862 A1 | 10/1996 |
| CA | 2379827 A1 | 1/2001 |

(Continued)

OTHER PUBLICATIONS

Hall, J.W. et al., "A Decision-Support Methodology for Performance-Based Asset Management", Civil Engineering and Environmental Systems, vol. 21, No. 1, pp. 51-75 (Mar. 2004).

(Continued)

*Primary Examiner* — Sangwoo Ahn
(74) *Attorney, Agent, or Firm* — Oyen Wiggs Green & Mutala LLP

(57) ABSTRACT

Apparatus and methods for managing and upgrading components in an infrastructure are provided. Records relating to components may be retrieved from a database and separated into subsets based on conditions of those components, the types of those components, deterioration models of those components, and/or other factors. Future condition values may be calculated for each subset, and likelihoods of failure of components may be determined for each subset based on those future condition values. The estimated condition values may be used in order to determine an optimal approach to maintaining, refurbishing, and/or replacing the components in the infrastructure. Computational efficiency is increased.

31 Claims, 4 Drawing Sheets

(51) Int. Cl.
*G06Q 10/04* (2012.01)
*G06Q 50/06* (2012.01)

(56) References Cited

U.S. PATENT DOCUMENTS

| | | | |
|---|---|---|---|
| 5,617,342 | A | 4/1997 | Elazouni |
| 5,710,723 | A | 1/1998 | Hoth et al. |
| 5,953,707 | A | 9/1999 | Huang et al. |
| 6,006,171 | A | 12/1999 | Vines et al. |
| 6,219,597 | B1 | 4/2001 | Longere |
| 6,219,654 | B1 | 4/2001 | Ruffin |
| 7,353,180 | B1 | 4/2008 | Silverstone et al. |
| 7,363,259 | B2 | 4/2008 | Baseman et al. |
| 7,457,762 | B2 | 11/2008 | Wetzer et al. |
| 7,496,475 | B2 | 2/2009 | Byrne et al. |
| 7,657,534 | B2 | 2/2010 | Kirkegaard |
| 7,716,077 | B1 | 5/2010 | Mikurak |
| 7,797,179 | B2 | 9/2010 | Chakraborty et al. |
| 7,899,770 | B2 | 3/2011 | Thie et al. |
| 7,921,024 | B2 | 4/2011 | Hogan et al. |
| 7,957,991 | B2 | 6/2011 | Mikurak |
| 8,046,253 | B2 | 10/2011 | Scates |
| 8,126,574 | B2 | 2/2012 | Discenzo et al. |
| 8,170,893 | B1 | 5/2012 | Rossi |
| 8,266,066 | B1 | 9/2012 | Wezter et al. |
| 8,306,887 | B1 | 11/2012 | Bucholtz et al. |
| 8,478,626 | B2 | 7/2013 | Strange et al. |
| 8,489,491 | B2 | 7/2013 | Gulati et al. |
| 8,560,462 | B2 | 10/2013 | Amir et al. |
| 8,571,963 | B2 | 10/2013 | Ameriks et al. |
| 8,712,814 | B1 | 4/2014 | Saunderson |
| 2003/0144897 | A1 | 7/2003 | Burruss et al. |
| 2004/0138938 | A1 | 7/2004 | Quintus et al. |
| 2005/0065826 | A1* | 3/2005 | Baker ............... G06Q 10/063 705/40 |
| 2005/0234815 | A1 | 10/2005 | Martin |
| 2006/0009935 | A1 | 1/2006 | Uzarski et al. |
| 2006/0064429 | A1* | 3/2006 | Yao ................... G06Q 30/02 |
| 2008/0065457 | A1 | 3/2008 | Hundt et al. |
| 2008/0071588 | A1 | 3/2008 | Eder |
| 2008/0082345 | A1 | 4/2008 | Greiner et al. |
| 2008/0177753 | A1 | 7/2008 | Thomas et al. |
| 2008/0255862 | A1* | 10/2008 | Bailey ............... G06Q 40/06 705/1.1 |
| 2008/0255902 | A1 | 10/2008 | Poer et al. |
| 2008/0312990 | A1 | 12/2008 | Byrne |
| 2009/0157891 | A1 | 6/2009 | Hughes |
| 2009/0164385 | A1 | 6/2009 | Frain et al. |
| 2009/0182594 | A1* | 7/2009 | Choubey ........... G06F 19/327 705/7.33 |
| 2009/0216612 | A1 | 8/2009 | Pyle et al. |
| 2009/0222335 | A1 | 9/2009 | Gopal et al. |
| 2009/0287519 | A1 | 11/2009 | Jennings |
| 2010/0013639 | A1 | 1/2010 | Revert |
| 2010/0023361 | A1 | 1/2010 | Brower et al. |
| 2010/0036702 | A1 | 2/2010 | Sitton |
| 2010/0198888 | A1 | 8/2010 | Blomstedt et al. |
| 2010/0286798 | A1 | 11/2010 | Keyes et al. |
| 2011/0035243 | A1 | 2/2011 | Shah et al. |
| 2011/0119110 | A1 | 5/2011 | Lin et al. |
| 2012/0036050 | A1 | 2/2012 | Norris |
| 2012/0166249 | A1 | 6/2012 | Jackson |
| 2012/0173299 | A1 | 7/2012 | McMullin |
| 2012/0173300 | A1* | 7/2012 | Davenport ........... G06Q 10/063 705/7.28 |
| 2012/0221371 | A1 | 8/2012 | Hegazy et al. |
| 2013/0041705 | A1* | 2/2013 | Hampapur ............ G06Q 10/10 705/7.12 |
| 2013/0138482 | A1 | 5/2013 | Anderson et al. |
| 2015/0310349 | A1* | 10/2015 | Li .......................... G06N 7/005 706/52 |
| 2016/0132839 | A1* | 5/2016 | Randolph ........... G06F 17/3087 705/305 |

FOREIGN PATENT DOCUMENTS

| | | | |
|---|---|---|---|
| CA | 2374578 | A1 | 9/2001 |
| CA | 2475103 | A1 | 8/2003 |
| CA | 2440173 | A1 | 3/2005 |
| CA | 2592875 | A1 | 7/2006 |
| JP | 2002-140466 | A | 5/2002 |
| JP | 4642085 | B2 | 3/2011 |
| WO | 0034911 | A2 | 6/2000 |
| WO | 2006036924 | A2 | 4/2006 |
| WO | 2011079324 | A2 | 6/2011 |
| WO | 2013082742 | A1 | 6/2013 |

OTHER PUBLICATIONS

Schneider, J. et al., "Asset management techniques", Electrical Power and Energy Systems, vol. 28, pp. 643-654 (2006).
Moon, J.M., "Life Cycle Assessment through On-Line Database Linked with Various Enterprise Database Systems" (2003).
Murphy, K.E. et al., "Using Cost Benefit Analysis for Enterprise Resource Planning Project Evaluation: A Case for Including Intangibles", Proceedings of the 34th International Conference on System Sciences (2001).
Wurzbach, R.N., "A web-based cost benefit analysis method for predictive maintenance", Feb. 2002, <http://www.mrgcorp.com/wp_files/cba_pdm25.pdf>.

* cited by examiner

US 9,679,253 B2

METHODS FOR MAINTAINING INFRASTRUCTURE EQUIPMENT AND RELATED APPARATUS

CROSS-REFERENCE TO RELATED APPLICATIONS

This application claims the benefit under 35 U.S.C. §119 of U.S. Application No. 62/076,462 filed 6 Nov. 2014 and entitled SYSTEM FOR OPTIMAL UPGRADING OF GROUPS OF INFRASTRUCTURE COMPONENTS AND RELATED METHODS which is hereby incorporated herein by reference for all purposes.

FIELD

This invention relates to maintaining infrastructures, for example, power grids. Some embodiments provide automated systems for managing, replacement, upgrading and/or refurbishing of infrastructure components to keep the infrastructure functioning efficiently. The invention also relates to related methods.

BACKGROUND

Some enterprises maintain infrastructures made up of large numbers of infrastructure components for delivering some product or service. For example, an electrical power utility may maintain a power grid made up of infrastructure components such as generators, control systems, safety systems, switching equipment, circuit breakers, transmission lines including transmission towers, insulators, power poles, transformers, circuit breakers, and the like.

All components of an enterprise infrastructure in general will degrade over time. The rate at which these components degrade will vary depending upon the nature of the component as well as the use to which the component is put and the environment in which the component is used. Failure of components may have various consequences. In some cases, the consequences may be minor. In other cases, the consequences may be very serious. For example, failure of certain components may result in long term power outages, damage to the environment, and/or serious injury or even death.

In general, an enterprise such as an electrical power utility will want to maintain at least some components of its infrastructure on a proactive basis so as to reduce the likelihood that those components will fail. Maintaining a large infrastructure can be exceedingly expensive. Therefore, the enterprise in general will wish to optimize the use of its resources by carefully planning which components of its infrastructure to replace or upgrade and when to do such replacements or upgrades. Resources may be wasted in replacing some components too early, while the components still have a very low failure risk. On the other hand, resources may be wasted if a component is allowed to fail and the consequences of that failure are expensive or otherwise unacceptable.

For a given type of component, such as a utility pole, it is generally possible to predict the likelihood of failure of the component as a function of time. Such predictions may, for example, be based on studies of when other components of a similar type have failed in a large population of components, or on surveys of the condition of the components. Using such information, an enterprise may optimize its program of replacement and upgrading of infrastructure components by, for each component, calculating a likelihood of failure in a given planning window, determining the likely consequence of such a failure, and prioritizing components to replace or upgrade based on such results. The computational cost of such optimization tends to increase very rapidly with the number of variables for which the optimization is conducted. The number of variables generally scales with the number of infrastructure components.

Enterprises generally use computer systems to facilitate such prioritization, particularly in large enterprises with complicated infrastructure made up of potentially many hundreds of thousands of components. However, the computation involved in such prioritization may be extremely computationally intensive due to the large number of components and computing steps involved. This may require that enterprises allocate significant time and/or resources to such prioritization, since powerful computer systems and/or lengthy computation times may be required in order to perform the necessary computations. This may place a substantial burden on enterprises, particularly where there is a desire to compare multiple scenarios based on different prioritizations. Accordingly, there is a need for more computationally-efficient methods and apparatus for prioritizing components for replacement and/or upgrading. There is also a need for more efficient methods and apparatus for performing other calculations which involve determining the risk that individual components in a large infrastructure may fail.

SUMMARY

This invention has a number of aspects. Some aspects comprise methods for working with components of an infrastructure. Some aspects comprise data processing systems for working with components of an infrastructure. These systems and methods perform optimizations that are based on information about the infrastructure components. The computational complexity of the optimizations is very significantly reduced by collecting the infrastructure components into subsets that, for the purpose of the optimization, can be treated as a single entity.

For example, in optimizations where failure risk and replacement cost (both of these may be functions of time) for infrastructure components are used by an optimizer to establish an optimal schedule for replacing, upgrading and/or refurbishing the infrastructure components, the infrastructure components may be grouped into subset such that each subset contains infrastructure components of the same type in approximately the same condition, having approximately the same consequences of failure and approximately the same replacement cost. The infrastructure components that are grouped into each subset may be very different in other respects. For example, they may be geographically separated from one another.

An aspect of the present disclosure provides a computer implemented method for estimating the future condition of a plurality of objects in a group of objects. The method comprises providing a database containing information about each of the objects. The information may be stored in a logical record that includes one or more fields describing a first condition of the object. The method comprises, at a data processor, automatically sorting the plurality of objects into a plurality of subsets based on similarity of the one or more fields to one or more representative values associated with the subset. The method comprises, for a first subset of the plurality of subsets, computing an estimated future condition based on the one or more representative values associated with the first subset. The method comprises assigning the estimated future condition to all of the objects in the first subset.

An aspect of the present disclosure provides a system for estimating the future condition of a plurality of objects in a group of objects. The system comprises a data store containing information regarding each of the objects. The information may be provided in a logical record. The record includes one or more fields describing the condition of the object. The system also comprises a data processor configured to automatically sort the plurality of objects into a plurality of subsets based on similarity of the one or more fields to one or more representative values associated with the subset. The data processor is configured to, for a first subset of the plurality of subsets, compute an estimated future condition based on the one or more representative values associated with the first subset. The data processor is configured to assign the estimated future condition to all of the objects in the first subset.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
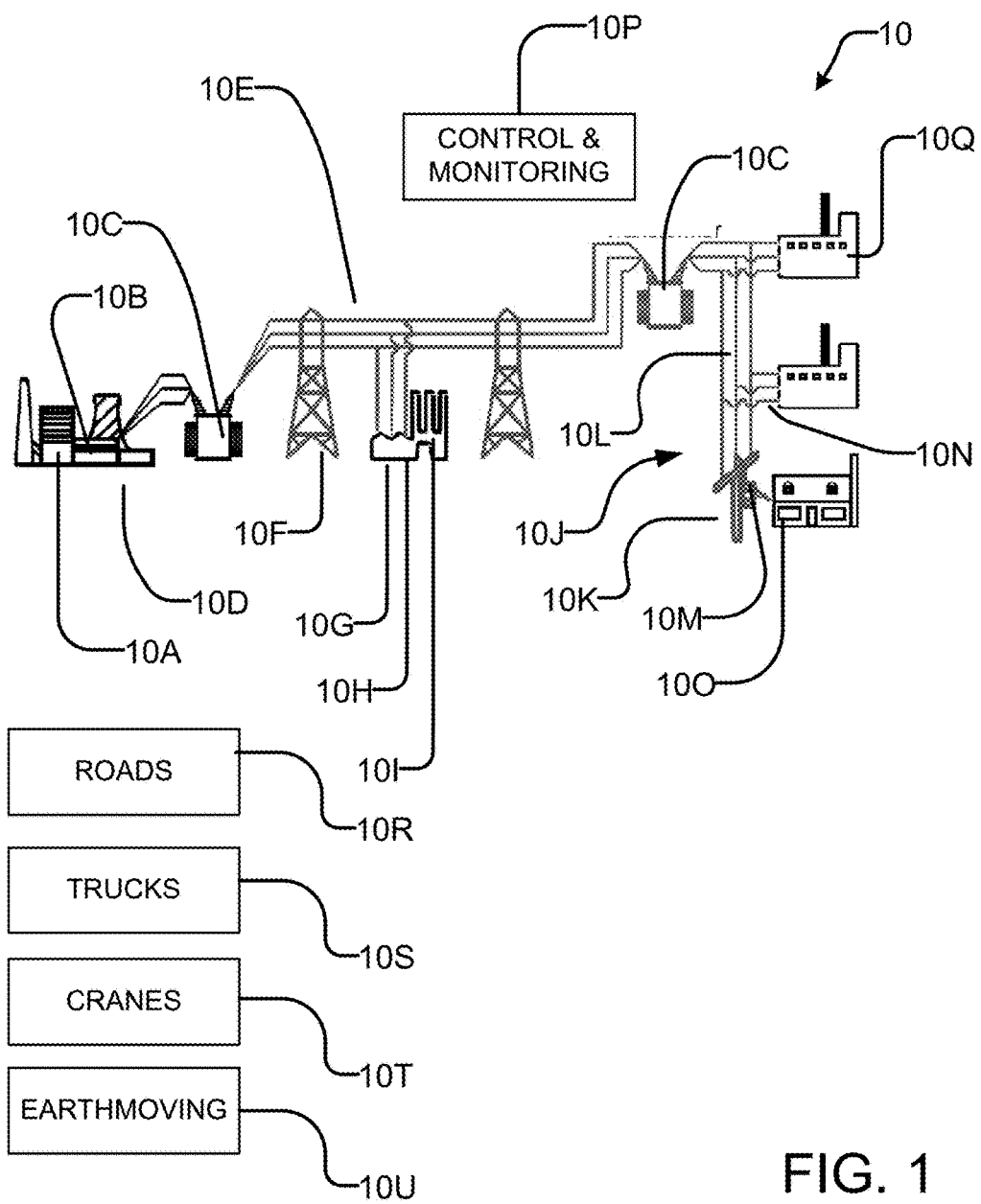
FIG. 1 is a schematic illustration showing an example infrastructure of an electrical utility.

FIG. 1 shows an example infrastructure 10 for an electrical power utility. The infrastructure 10 includes a plurality of generators 10A, switching gear 10B, and transformers 10C and protective equipment 10D associated with the generators, transmission lines 10E made up of towers 10F which carry electricity to substations 10G, switching equipment 10H, and step down transformers 10I at the substations, distribution lines 10J which include poles 10K and wires 10L, local transformers 10M, power drops 10N, and power meters 10O. The infrastructure also includes a control and monitoring system 10P, buildings 10Q, access roads 10R, a fleet of maintenance equipment including trucks 10S, cranes 10T, earth moving equipment 10U, and so on.

Figure 2:
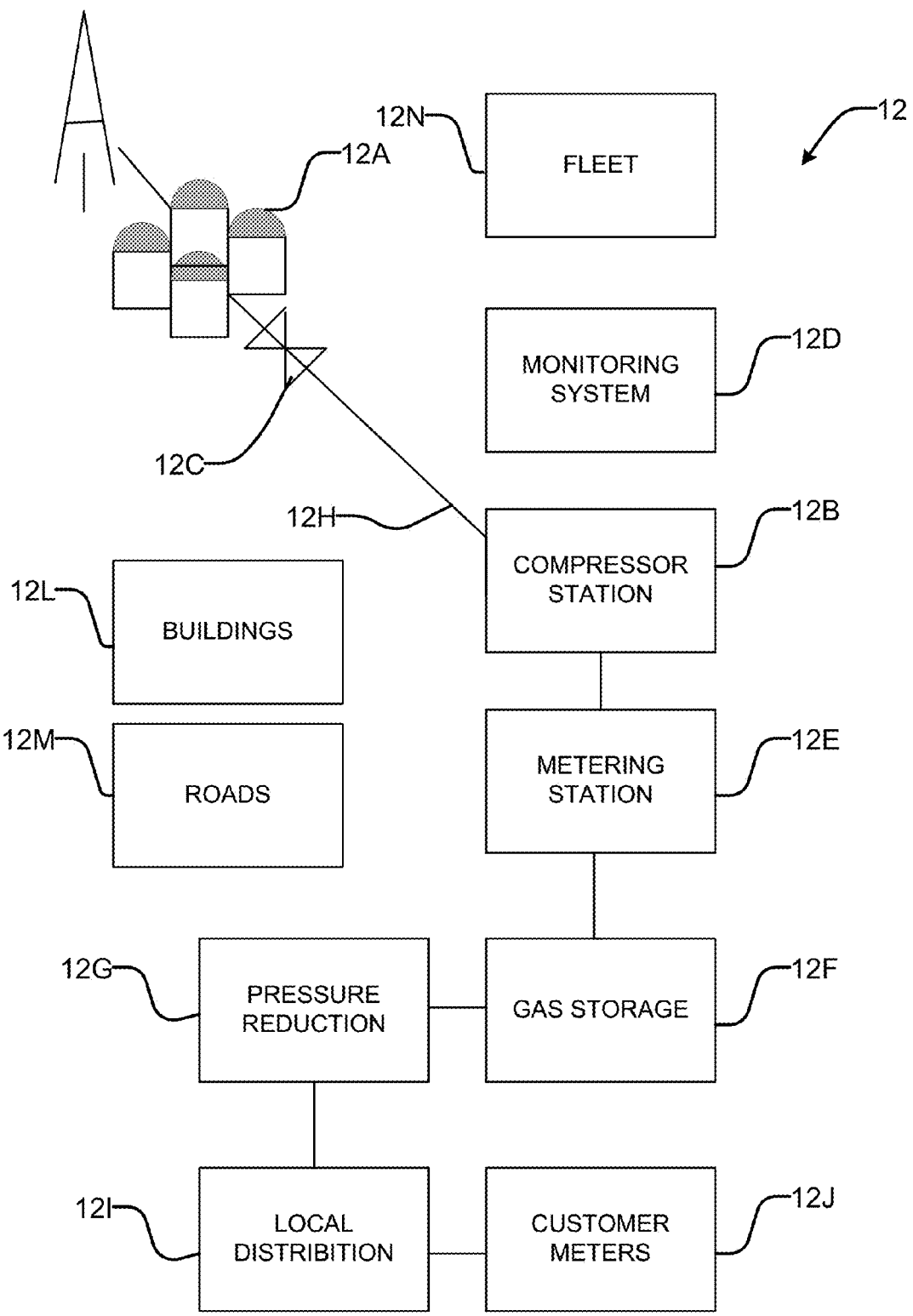
FIG. 2 is a schematic view showing an example infrastructure for a pipeline system (e.g. a pipeline for distributing oil, natural gas, water, or the like).

FIG. 2 shows another example infrastructure 12 for a pipeline system. The infrastructure 12 of FIG. 2 includes storage tanks 12A, pumps/compressors 12B, valves 12C, monitoring systems 12D, metering stations 12E, gas storage 12F, pressure reduction 12G, pipelines 12H, local distribution pipes 12I, customer gas meters 12J, buildings 12L, roads 12M, a vehicle fleet 12N, and so on.

Figure 3:
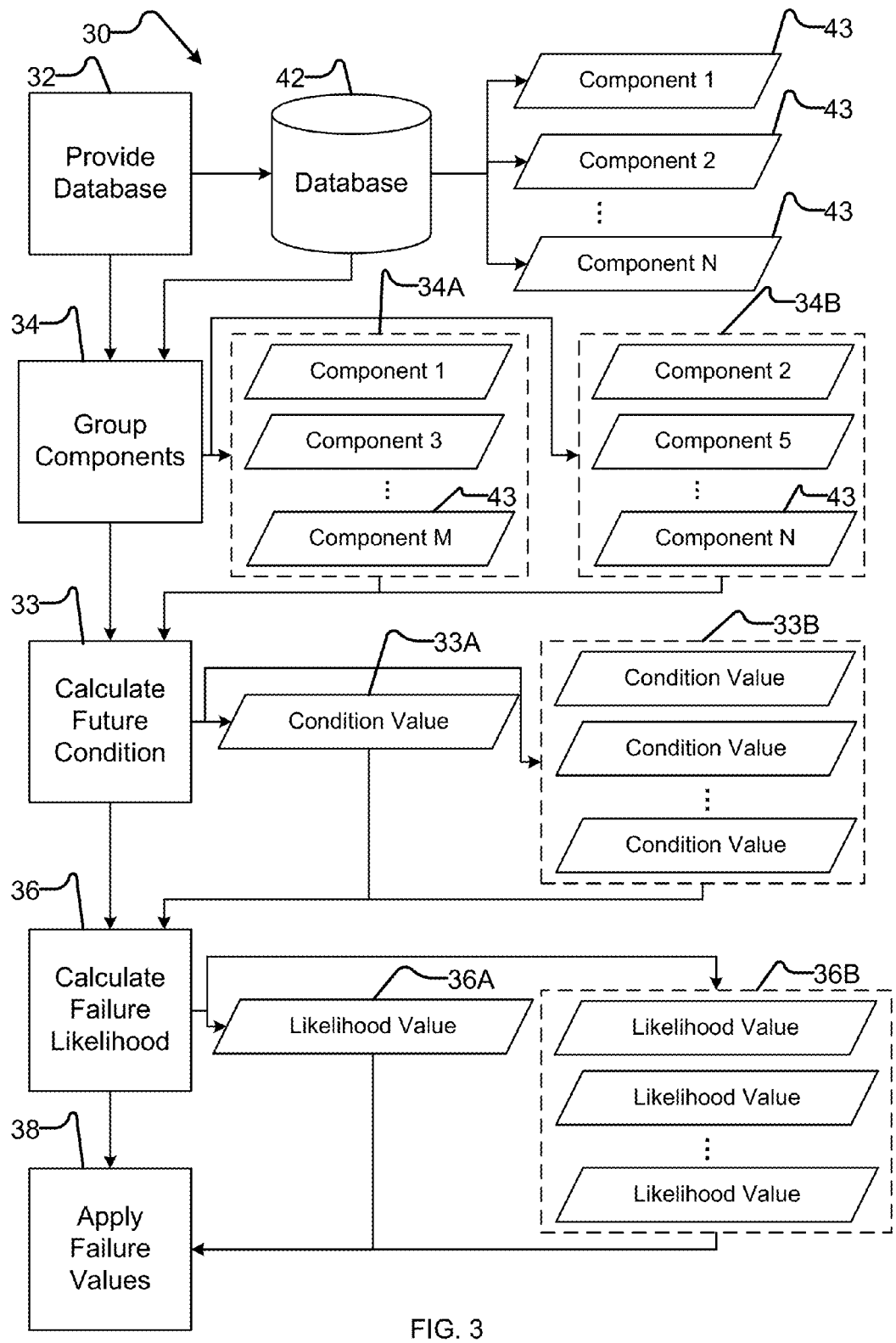
FIG. 3 is a flowchart illustrating a method according to an example embodiment.

FIG. 3 illustrates an example method according to one embodiment of the invention. Method 30 is directed toward predicting the likelihood of failure of individual components in an infrastructure. Method 30 takes advantage of the fact that a typical infrastructure has a great many components of a similar type. For example, an electrical utility infrastructure may include a very large number of power poles of the same type of construction. The electrical utility may also include a great number of transmission towers of a similar construction or a great number of trucks of the same model or a large number of similar transformers or switches.

The likelihood of failure of any one of these infrastructure components in a given time period is, at least in part, a function of the condition of the particular infrastructure component. Method 30 can significantly reduce the computational resources required to determine a likelihood of failure for a great many components of an infrastructure by grouping together components of a similar type which have the same or a closely similar condition. A single calculation or a small number of calculations may then be performed to calculate the likelihood of failure of an entire subset of the infrastructure components. These calculations may, for example, yield a probability of failure for the components of the subset at one or more times.

Figure 3A:
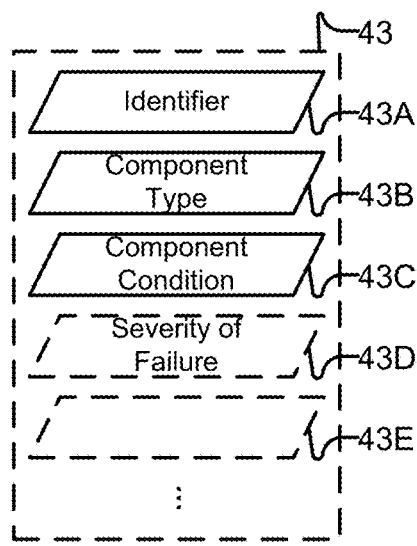
FIG. 3A is an example database record for an infrastructure component.

Block 32 of method 30 provides a database 42 containing information regarding each component of an infrastructure (e.g. infrastructure 10, infrastructure 12, and/or another infrastructure). Database 42, for example, may include a unique reference to each individual infrastructure component as well as information specifying the type of the component and the condition of the component. Database 42, for example, may provide such references and/or information in records 43, an example of which is shown in FIG. 3A. Database 42 may be or may draw information from an inventory database that maintains an inventory of components of the infrastructure.

FIG. 3A is a schematic illustration of an example database record 43 which includes a unique identifier 43A, a field 43B identifying the type of the component, and a field 43C identifying the current condition of the component (and/or information from which current condition may be derived). Other fields, such as fields 43D and/or 43E, may also, or alternatively, be provided. For example, an estimate of the severity of the consequences of a failure may be identified by field 43D. The current condition identified at field 43C may be predetermined. Alternatively, or in addition, the current condition identified at field 43C may be derived from a number of sources which provide information relative to the physical condition of the infrastructure component in question. For example, a value indicative of the condition of an infrastructure component may be specified in a desired range (for example zero to a hundred or zero to one). The current condition may be based on one or more of:

the age of the infrastructure component (e.g. the length of time since the infrastructure component was manufactured);

the amount of time that the infrastructure component has been in use (e.g. a number of run hours for the infrastructure component or a length of time since the infrastructure component was installed in the infrastructure);

the amount of work done by the infrastructure component (e.g. a number of times a switch has been cycled, a total amount of energy that has been handled by the infrastructure component, an average capacity at which the component has been operated, and so on;

physical measurements of the component such as operating temperature, results of oil sampling, results of vibration measurements, etc.;

evaluations of the condition of the component based upon inspections by technical personnel;

the history of maintenance activities that have been applied to the component;

the environment in which the infrastructure component operates (e.g. utility poles near the edge of a street may deteriorate more quickly than more remotely-placed utility poles);

and so on.

In some embodiments, at least some information relating to the current condition of a component is derived from sensors associated with the component. The current condition is sometimes represented as a value (e.g. a scalar or vector value), referred to herein as a "condition value", which may be compared to other such values.

Although the conditions of infrastructure components of different types are influenced most strongly by different factors, for infrastructure components of the same type the condition of the infrastructure component is generally governed by the same factors.

Block 34 groups together infrastructure components of the same type (e.g. by field 43B or by the fact that the future condition of the components can be represented by the same deterioration model) which have approximately the same condition. Block 34 may, for example, comprise doing a search of database 42.

The number of subsets into which a group of components of the same type are separated may be user selectable. In the exemplary embodiment depicted in FIG. 3, the components associated with records 43 are separated into two subsets, namely subsets 34A and 34B. For example, subset 34A may comprise components (and/or records 43 associated with components) which have current condition values (e.g. represented at field 43C) which are greater than (and, optionally, equal to) a threshold. Subset 34B may comprise components and/or records 43 which have condition values which are less than (and, optionally, equal to) a threshold. For example, subset 34A may correspond to all poles 10K having a 'good' condition (which may be inferred if the poles were installed on or after a certain date), whereas subset 34B may correspond to all poles 10K having a condition less than 'good' (which may be inferred if the poles were installed before that certain date).

In most embodiments the infrastructure components are sorted into a number of subsets much larger than two such that, a single condition and/or probability of failure and/or failure risk can be determined for each subset and that single condition and/or probability of failure and/or failure risk is adequately representative of each infrastructure component that is include in the subset. For example, in some embodiments, if a value for the condition or probability of failure or failure risk were computed separately for all of the infrastructure components included in a subset then each of these values would be within 12% (or some tighter tolerance such as ±10% or ±5% or ±2%) of the representative value for the condition or probability of failure or failure risk established for the subset.

In some embodiments, each subset corresponds to a representative condition value against which each component's condition value is compared for similarity. Different subsets may contain components having condition values in corresponding defined ranges. The representative condition value may, for example, be based on the current condition value associated with a particular component, and/or the representative condition value may be predetermined for a given subset. In some embodiments, condition values are rated on a numeric scale (e.g. 1-10), and/or may be divided into ranges (e.g. an "excellent" range from 9-10, a "good" range from 6-8, a "poor" range from 2-4, etc.). In some embodiments, condition values may be determined based on combinations of other values; for example, a condition value for an electrical transformer may be determined to be a function (such as a linear combination in some cases) of an oil analysis score, an excitation current test score, a maintenance history score, and an age score. Each of these scores may, for example, be weighted (e.g. the age score may be afforded more weight than the other scores in some cases).

In some embodiments, components' severities of failure and likelihood of failure are represented together, as a failure risk. The failure risk may be a function of both severity and likelihood (e.g. in a simple case failure risk=severity× likelihood). Severity depends on the nature of the component and its role in the infrastructure. Components may be binned based on similarity in failure risk instead of, or in addition to, similarity in likelihood and/or severity of failure independently.

In some embodiments, subsets are determined based on the types of components, the components' current condition, and one or both of the components' severity of failure, and the replacement cost of the components. In such cases, all of the components in each subset may have the same or nearly the same failure risk. Such embodiments are advantageous because an optimizer may optimize a schedule for infrastructure component upgrades or replacements based on failure risk or failure risk and replacement cost.

Where components are grouped into subsets that have the same or nearly the same failure risk (or failure risk and replacement cost in some embodiments) the subset may be treated as a single component for many optimization purposes. Thus, grouping components into subsets as described herein may dramatically reduce the number of variables to be optimized and consequently dramatically reduce the computational cost of optimization. For example if the subsets each contain, on average 100 to 1000 components the number of variables involved in optimizing a schedule for upgrading and/or replacing the components can be reduced by a factor of 100 to 1000. This in turn may reduce the computation required for the optimization by a factor of much more than 100 or 1000.

Thus, referring back to previous examples, in some embodiments, two utility poles which have similar or identical current conditions may be grouped into the same subset if those poles also have similar severities of failure and similar replacement cost. For example, both utility poles may host major transmission lines into urban centers such that failure of either one of the poles would result in similarly wide-spread outages; as another example, if one of the utility poles hosted a minor transmission line to a small number of residential locations such that failure of the pole would result in a small-scale outages, that pole might not be grouped into a subset with a utility pole hosting a major transmission line. Further, in some embodiments the two poles (in this example) would be placed in the same subset only if they also have similar replacement costs.

In some embodiments, subsets may alternatively, or in addition, be determined based on factors such as the types of components (e.g. utility poles may only be grouped with other utility poles, even if a given utility pole could be said to have the same current condition as another component of a different type), the environments that the components are in, the operational load placed on the components, deterioration models associated with each component (e.g. each type of component may have associated with it a function modelling how the condition of the component is expected to change over time), geographic region, user-provided criteria, likelihood of failure, severity and/or consequence of failure, replacement cost of the component, and/or other factors. In some embodiments, subsets may be determined without first determining the current condition values for some or all of components 43.

Block 34 may group together into one subset components that would not normally be grouped together using simple criteria such as grouping by location, grouping by installation date, or the like.

There is a tradeoff between accuracy of prediction of the likelihood of failure of a particular component and the range of conditions that are represented within each subset (which, in turn can depend on the number of subsets that are established). For example, if a large set of infrastructure components of the same type is sorted into only three subsets (for example, indicating good or better condition, moderate and better condition, and poor condition) then, within each subset, there will be infrastructure components having any of a fairly wide range of different conditions. Consequently, a likelihood of failure predicted for the entire subset may differ fairly significantly from the actual likelihood of failure of an individual infrastructure component included in the subset. However, the number of computations required to estimate a likelihood of failure for each of the three groups may still be dramatically less than the number of computations required to estimate a likelihood of failure for each component, leading to a substantial improvement in computational efficiency.

For most practical applications, the number of subsets M into which a group of infrastructure components of the same type is sorted is in the range of M=2 to M=N/2 subsets, where N is the number of components in the group of infrastructure components. In some circumstances, it can be desirable for the number of subsets M to be in the range N/1000 to N/10. In some circumstances, however other numbers of subsets may be used.

As described below, a subset containing a plurality of infrastructure components may be treated as a single component for certain project planning and optimization purposes. In such cases it can be convenient to limit the number of infrastructure components included in each subset to a number that is manageable for a single project to replace the infrastructure components. This may result in a plurality of subsets that each have the same criteria for membership in the subset. For example, some utilities may prefer to include on the order of 100 or so utility poles in subsets of utility poles. This is a large enough number that the computation involved in optimizing a schedule for replacement of the utility poles can be dramatically reduced and is a small enough number that a project for replacing the utility poles in each subset is manageable in size while the number of subsets remains large enough to facilitate optimization (e.g. even in the unlikely event that a utility infrastructure included an exceedingly large number of utility poles having the identical present conditions and failure risks it could be undesirable to group all of those utility poles into one subset in most cases since most utilities would not have the capacity to replace such an exceedingly large number of utility poles all at once and most optimizations would be unable to schedule such a project since it would probably exceed realistic constraints on available workforce in any year or other planning period).

Components may be sorted into subsets based on their condition and/or other factors, as described above. For example, in at least one embodiment, M=3 subsets are used, corresponding to components in good, moderate, and poor condition, respectively. In another example embodiment, M=5 subsets are used, corresponding to components in very good, good, moderate, poor, and very poor condition, respectively. As discussed above, further constraints may be imposed on the components (e.g. they may need to have similar deterioration models and/or severities of failure). In some embodiments, M=100, M=1,000, M=10,000, and/or M=20,000 subsets are used. In some embodiments, roughly M≅√N subsets are used. In some embodiments, a user-determined number of subsets are used.

In some embodiments, the number of subsets M into which a group of infrastructure components of the same type is sorted is determined dynamically. For example, block 34 may identify a first component and group with the first component any other components with the same or similar condition value (e.g. as provided by field 43C) or better, with the same or similar condition value and failure risk, or better still, with the same or similar condition value, failure risk and replacement cost. In some circumstances, such as when the particular components of a certain type in the infrastructure all have condition values sufficiently different from the condition values of other components of the same type, the number of subsets M may be the same as the number of components N.

Different types of components may be grouped into different numbers of subsets. In some embodiments, some types of components are not grouped into subsets (or, alternatively, each component of a given type is separated into its own subset). For example, an enterprise may wish to consider especially large, costly, complex, uncommon, and/or specialized components individually, whereas large numbers of more common, simple, inexpensive, generic, and/or small components may be grouped together into subsets. For example, in the exemplary infrastructure 10, each building 10Q may be considered individually, without being grouped into a subset with other buildings 10Q, or may be or grouped into 10 single-element subsets. Poles 10K, in contrast, may be grouped into just a few (e.g. 2, 3, 4, 5, or more) subsets. In some embodiments, different numbers M of subsets may be used for components in different regions, components in different environments, components with different deterioration models, and/or any other identifiable group of components.

In some embodiments, the size of subsets is capped at a certain number S. As with the number of subsets M, the maximum size of subsets S may vary between subsets depending on the type of the component contained by the subset, condition values of such components, geographic region of such components, deterioration models of such components, and/or other factors. The number of subsets may, for example, be determined based at least in part on the maximum size of subsets S. For example, if records 43 correspond to 2,000,000 roughly-identical utility poles, and if the maximum size of subsets S for utility poles is 100, then M=20,000 subsets of utility poles may be generated.

Block 33 calculates a future condition value for each of the infrastructure components based on available information. In some embodiments block 33 calculates a series of future condition values (e.g. a projected condition each month or each year for a planning period). In some embodiments block 33 determines a series of projected conditions for the infrastructure components of each subset at times that are spaced apart in a planning period which is 4 years or more. In some embodiments the planning period is 9 years or more. The planning period may be more than 20 years in some embodiments. Block 33 may, for example, compute a series of 50 or more projected conditions for each subset.

The estimation of future conditions may be based on information which may include, for example, current condition values provided by field 43C, the region of components, the environments in which components are located, deterioration models of components, and/or any other factors identified above or otherwise available. This calculation can be simplified in the case where the available information for a significant number of the infrastructure components is the same or similar.

Consider, for example, the case of utility poles in an electrical power utility. There may be many thousands or even millions of utility poles, but many of these may have (for example) similar current condition and deterioration models, and may have been grouped together into a subset at step 34. All of the power poles in the subset may be estimated to have the same future condition value. Computation may be substantially reduced by calculating the future condition of these similar utility poles once for the entire subset and then assigning every member of that subset the same calculated future condition value or series of future condition values.

For example, in the exemplary embodiment shown in FIG. 3, block 33 calculates a first future condition value 33A associated with first subset 34A. First future condition value 33A may be calculated based on, for example, condition information which is representative of the components in the subset. For example, such condition information may be derived from one or more records 43 and/or fields 43C corresponding to one or more components in subset 34A. Alternatively, or in addition, such condition information may be derived from representative condition information associated with subset 34A, which may or may not correspond to a particular record 43 and/or field 43C. For example, subset 34A may contain utility poles with current condition values in a range (e.g. a "good" range, ranging from 6 to 8 in an example 10-point scale). Future condition value 33A may be determined, for example, based on a representative value derived from the range such as a minimum, maximum or midpoint of the range (i.e. a midpoint of 7 in the preceding example) or based on another calculated representative value such as an average, mean, median, maximum, or minimum etc. of the condition values for the components included in the subset.

In some embodiments, block 33 may calculate a plurality of future condition values 33B for a subset 34B corresponding to a plurality of future times. For example, block 33 may calculate a first future condition value 33B corresponding to a date one month in the future, and a second future condition value 33B corresponding to a date two months in the future. This may be repeated for other future times. In some embodiments, each of the plurality of condition values 33B is calculated for the entire subset 34B, as described above.

Figure 3B:
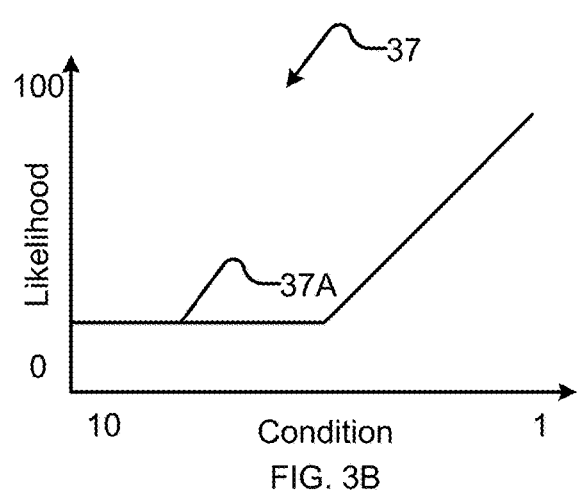
FIG. 3B is a graph of a curve that models the likelihood of failure of a particular infrastructure component as a function of condition according to an example embodiment.

Block 36 determines from the calculated conditions the likelihood of failure of the infrastructure components in each subgroup or a time series of likelihoods of failure. It is not necessary to compute the likelihood of failure for each infrastructure component individually. Since all of the members of each subgroup have the same or nearly the same condition, one calculation of the likelihood of failure may be made for an entire subset. The likelihood of failure may be recorded in database 42, e.g. in field 43E. The likelihood of failure may be modeled empirically, as shown, for example, in graph 37 of FIG. 3B. Graph 37 shows a curve 37A which illustrates the increasing likelihood of failure (denoted on the vertical axis) of a component 43 as its condition (denoted on the horizontal axis) decreases. Note that the horizontal axis runs from high to low.

For example, block 36 may calculate a likelihood value 36A corresponding to subset 34A based on condition value 33A. Likelihood value 36A is an estimate of the likelihood of failure associated with the components in subset 34A. Block 36 may optionally calculate a failure risks (or time series of failure risks) for each subset in cases where the infrastructure components in the subset have been grouped into subsets which share the same or nearly the same failure consequences.

In block 38 the failure risk information is applied. Block 38 may include any of a wide variety of alternatives including:
- generating reports (e.g. graphs, risk matrices, etc.) for display to a user;
- storing the failure risk information for later processing;
- creating histograms indicating the number of different infrastructure components of the same type in each subset;
- optimizing planning for how many infrastructure components of different types should be replaced on an annual (or other periodic) basis in order to maintain a failure risk for the overall infrastructure below some desired threshold;
- scheduling the replacement of individual infrastructure components;
- and the like.

Where block 38 includes optimization, the optimization may treat one or more individual ones of the subsets as a single component. In some embodiments, optimization is performed and each of the subsets is treated in the optimization as a single component. The optimization may take as an input the failure risks determined in block 36, constraints on replacement of infrastructure components (for example there may be a limit on how many utility poles can be replaced in a certain period based on factors such as limited workforce capacity, limited periods during which outages are acceptable, limited availability or replacement poles or other necessary parts, limited budget, etc. The optimization may output a schedule that includes dates for replacement or upgrading of the components in each of the subsets. Optimization may be dramatically simplified due to the replacement of a large number of components with a much smaller number of subsets in the optimization. In some cases the optimization is of a type for which the computational complexity scales as a second or higher power of the number of components for which the optimization is being performed. In some embodiments the run time of the optimization is reduced by a factor of at least 100 in comparison to the run time that would be required if all of the infrastructure components were subjected to the optimization individually.

Figure 4:
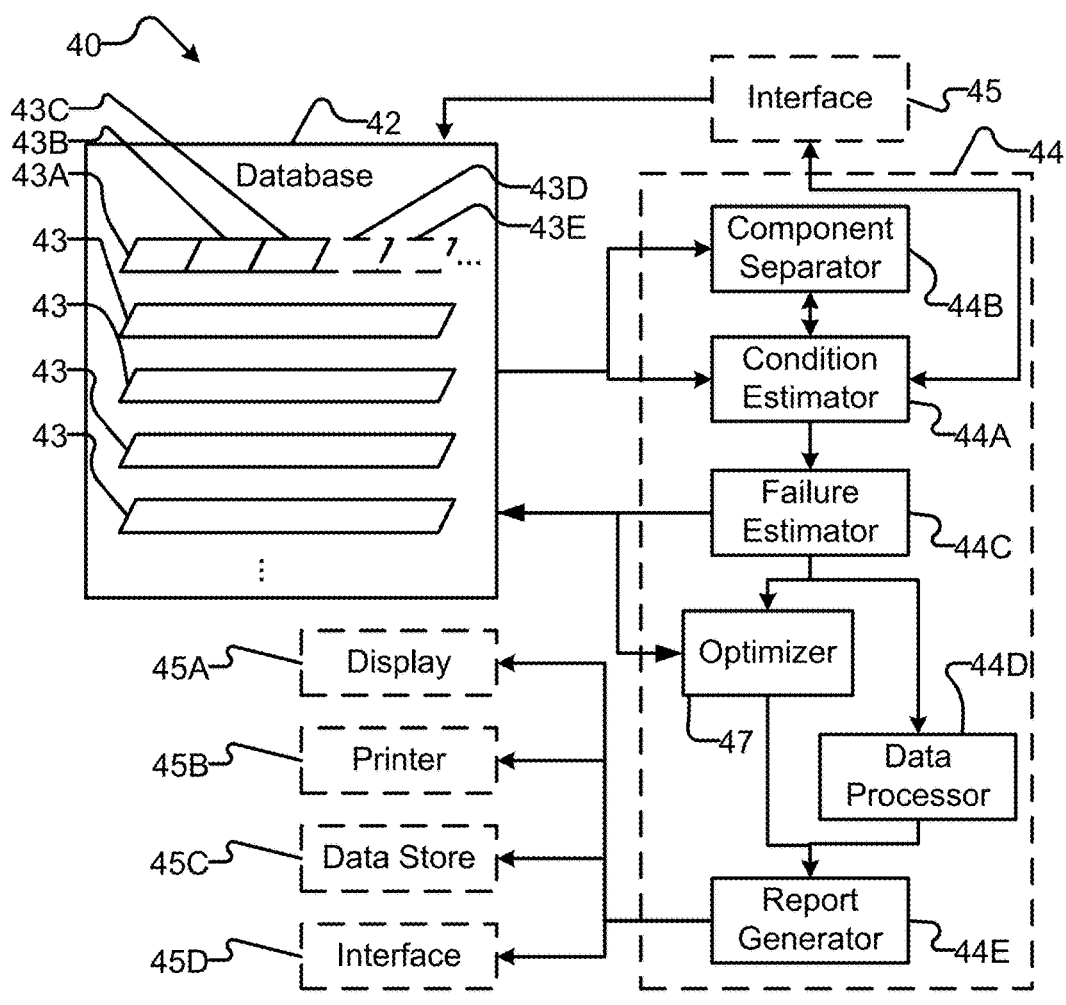
FIG. 4 is a block diagram illustrating apparatus according to an example embodiment.

FIG. 4 illustrates a system 40 according to another example embodiment. System 40 includes a database 42 and a processor 44. Processor 44 is configured to obtain from database 42 information relevant to the condition of infrastructure components recorded in database 42. From this information, processor 44 is configured to compute or otherwise determine a condition for each of the infrastructure components. For this purpose, processor 44 implements a condition estimator 44A. Condition estimator 44A may perform, for example, the method of block 33, as described above with reference to FIG. 3.

In some embodiments, information relevant to the condition of infrastructure components of certain types may be derived directly from the infrastructure components (e.g. based on sensor readings or the like). For example, system 40 may include an interface 45 which receives sensor readings from components and records the sensor readings or information derived from the sensor readings into database 42, and/or provides the sensor readings to condition estimator 44A and/or processor 44 more generally.

In some embodiments, information relevant to the condition of infrastructure components of certain types may be derived by inspection of testing of the infrastructure components. Results of the testing may be entered into database 43 by way of a suitable user interface.

Interface 45 and/or another interface may communicate with condition estimator 44A to provide condition estimator 44A with user inputs which may affect the estimation of condition values by condition estimator 44A.

Processor 44 may implement a component separator or sorter 44B, which may separate components identified in database 42 into a plurality of subsets. Component separator 44B may perform the method of block 32, as described above with reference to FIG. 3.

Processor 44 also implements determination of a level of failure risk for the infrastructure components in each subset. For this purpose, processor 44 implements a failure risk estimator 44C. Failure risk estimator 44C may store the failure risk assigned to each infrastructure component (or a time series of failure risks at various future times) into the record for that infrastructure component in database 42 (e.g. in field 43E). A level of failure risk may comprise, for example, a likelihood of failure, a severity of the consequences of failure, a single computed failure risk value and/or other failure-related information relating to one or more infrastructure components. In some embodiments, the level of failure risk is determined by finding the product of the severity of failure and the likelihood of failure; that is, failure risk=severity×likelihood.

Processor 44 may then perform further processing based upon the failure risks identified and estimated by block 44C. System 40 includes an optimizer 47 that generates optimized schedules for replacing and/or upgrading. Optimizer 47 may comprise commercially available optimization software, for example. In some embodiments optimizer 47 comprises a linear programming optimizer or solver. Optimizer may be implemented on processor 44 or on another processor.

Optimizer 47 may be configured to determine an optimal schedule for replacement or upgrading of the infrastructure components which treats each subset as a single component to be replaced in one scheduled project. The optimizer may optimize for safety (minimizing failure risk) in some embodiments. Optimizer 47 may impose constraints such as available workforce, budgetary constraints, maximum allowable failure risk etc. on the optimization.

Optimizer 47 may be configured to yield a plurality of schedules optimized for different constraints. For example, one or more of the optimizations may set constraints that emphasize safety (e.g. that attempt to establish a schedule that constrains a measure of failure risk). One or more other optimizations may set constraints that constrain resources available for projects (e.g. manpower or equipment). One or more other optimizations may set budgetary constraints at different levels. In embodiments which perform a plurality of optimizations, grouping infrastructure components into subsets is particularly valuable for reducing computation since each of the optimizations may be dramatically simplified. In some embodiments optimizer 47 includes a system as described in PCT patent application publication WO2013/082724 which is hereby incorporated herein by reference for all purposes.

System 40 includes a report generator 44E configured to generate reports regarding the condition of infrastructure components. The reports may be displayed on a display 45A, printed on a printer 45B, stored in a data store 45C, transmitted to another system by an interface 45D, or the like.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a computer system for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Embodiments of the invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Where a record, field, entry, and/or other element of a database is referred to above, unless otherwise indicated, such reference should be interpreted as including a plurality of records, fields, entries, and/or other elements, as appropriate. Such reference should also be interpreted as including a portion of one or more records, fields, entries, and/or other elements, as appropriate. For example, a plurality of "physical" records in a database (i.e. records encoded in the database's structure) may be regarded as one "logical" record for the purpose of the description above and the claims below, even if the plurality of physical records includes information which is excluded from the logical record.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for coordinating maintenance of components of an infrastructure, the method performed using a computer system comprising one or more programmed data processors, the method comprising:

determining, by the one or more data processors, a current physical condition for each of a plurality of the infrastructure components, the current physical condition comprising a value indicating a current degree of deterioration of the corresponding infrastructure component;

sorting, by the one or more data processors, the plurality of infrastructure components into a plurality of groups based at least in part on the current physical conditions of the plurality of infrastructure components, each of the groups comprising a subset of the plurality of infrastructure components for which the determined current physical conditions of the infrastructure components sorted into the subset are similar to one another according to one or more similarity criteria;

by the one or more processors, associating a representative condition value with each of the groups, the representative condition values representative of the current physical conditions of the infrastructure components belonging to the respective groups;

estimating, by the one or more data processors, for each of the groups, using a deterioration model, a time series of estimated future physical conditions for the infrastructure components of the group, based on the representative condition associated with the group, the estimated future physical conditions each comprising a value indicating an estimated degree of deterioration of the infrastructure components of the group at a corresponding one of a plurality of future times which constitute the time series;

by the one or more data processors, performing an optimization to yield an optimized schedule of projects, each of the projects associated with one of the groups and comprising at least one of: replacing, upgrading and refurbishing the infrastructure components of the group wherein the optimization is based on the estimated time series of future physical conditions for the groups; and maintaining the infrastructure by at least one of: replacing, upgrading and refurbishing the infrastructure components of one of the groups according to the schedule of projects.

2. A method according to claim 1 wherein grouping the infrastructure components into the groups comprises computing a value representing a consequence of failure for each of the plurality of infrastructure components and including in each of the groups infrastructure components for which the consequence of failure has a similar value.

3. A method according to claim 2 comprising estimating a time series of future failure risks for each of the groups, the future failure risks based on the representative conditions for the groups wherein the optimization is based at least in part on the future failure risks.

4. A method according to claim 2 wherein:
the one or more similarity criteria comprise a severity range associated with one of the groups, the severity range defining a range of severity of failure consequences; and
sorting the infrastructure components into the groups comprises, for at least the one of the groups, comparing measures of severity of failure consequences for the plurality of infrastructure components to the severity range associated with the group and including in the group only one of the infrastructure components for which the severity of failure consequences is in the severity range.

5. A method according to claim 1 wherein the current physical condition values for the infrastructure components are represented by values on a scale, the similarity criteria comprise a range of the values for the current physical conditions to include in each of the groups, the method comprises calculating a representative failure risk based on at least one of the estimated future physical conditions, and the ranges of values are such that the representative failure risk for each of the groups is within 12% of failure risks determined for individual ones of the infrastructure components of the group based on the current physical conditions of the infrastructure components.

6. A method according to claim 1 wherein sorting the infrastructure components into groups comprises looking up replacement costs for the infrastructure components and including in each of the groups infrastructure components for which replacement costs are within a range specified by a replacement cost criterion of the one or more similarity criteria such that differences between replacement costs for all of the infrastructure components in each of the groups is less than a threshold amount.

7. A method according to claim 6 wherein:
the one or more similarity criteria comprise, for at least one of the plurality of groups, a replacement cost range associated with the group; and sorting the infrastructure components into the groups comprises including in each of the at least one groups only infrastructure components having replacement costs falling within the replacement cost range associated with the group.

8. A method according to claim 1 wherein optimizing a schedule of projects comprises performing a plurality of optimizations, each of the optimizations subject to a corresponding set of constraints, a first optimization of the plurality of optimizations associated with a different set of constraints than a second optimization of the plurality of optimizations.

9. A method according to claim 1 wherein determining the current physical conditions of the infrastructure components comprises, for each of the plurality of infrastructure components, retrieving from a database one or more data items related to the physical condition of the infrastructure component and determining the current physical condition of the infrastructure component by processing the plurality of data items.

10. A method according to claim 9 wherein the database contains results of testing the infrastructure components and the method determines the current physical condition based on the testing results.

11. A method according to claim 10 wherein the testing results comprise results of testing samples of oil from the infrastructure components.

12. A method according to claim 1 wherein:
the one or more similarity criteria comprise, for at least one of the plurality of groups, a condition threshold range associated with the group; and
sorting the infrastructure components into the groups comprises including in the at least one group only infrastructure components for which the current physical condition is within the condition threshold range associated with the at least one of the groups.

13. A method according to claim 12 comprising establishing the condition threshold range associated with the at least one group based on analysis of a range of current physical conditions of the plurality of infrastructure components.

14. A method according to claim 1 comprising establishing the similarity criteria for inclusion of the infrastructure components in the groups such that an equal number of the infrastructure components is sorted into each of the plurality of groups.

15. A method according to claim 1 wherein the plurality of infrastructure components comprises at least one of: transformers, utility poles, switchgear, pipeline sections, consumption meters, and valves.

16. A method according to claim 1 comprising:
providing a database containing a record for each of the infrastructure components, the record including one or more fields containing data describing at least a first condition of the infrastructure component;
wherein sorting the plurality of components into the groups comprises, for each of the infrastructure components, comparing the data from the one or more fields describing a first condition of the infrastructure components to representative condition values associated with the groups;
by the one or more data processors, for a first one of the groups, computing an estimated future physical condition based on the one or more representative values associated with the first group; and by the one or more data processors, assigning the estimated future physical condition to all of the infrastructure components in the first group.

17. A method according to claim 16 wherein the one or more fields comprises a plurality of fields, each of the plurality of fields containing data describing an aspect of the first condition of the infrastructure component.

18. A method according to claim 16 comprising, by the one or more data processors, establishing the one or more similarity criteria based on analysis of the one or more fields for the plurality of infrastructure components.

19. A method according to claim 18 comprising, by the one or more data processors, for each of the plurality of groups, automatically determining the one or more representative values associated with the group so that an equal number of the plurality of objects is sorted into each of the plurality of groups.

20. A method according to claim 18 wherein the one or more representative values comprise a representative severity of a consequence of failure of an infrastructure component and the one or more fields comprise a severity of a consequence of failure of the infrastructure component corresponding to the one or more fields and wherein the one or more similarity criteria comprise automatically determining that the severity is equal to the representative severity.

21. A method according to claim 16 comprising, by the one or more data processors, receiving one or more sensor values associated with one or more of the infrastructure components, processing the one or more sensor values to yield data, storing the data in the database, and using the data to compute or represent the first condition of the infrastructure component.

22. A method according to claim 16 comprising, by the one or more data processors, determining a type of one of the plurality of infrastructure components, processing the one or more fields according to an algorithm associated with the type to yield information indicative of a probability of failure of the infrastructure component, and storing the information indicative of the probability of failure of the infrastructure component in the database.

23. A method according to claim 16 wherein performing the optimization is based on failure risks for the groups.

24. A method according to claim 16 comprising, by the one or more data processors, ranking the infrastructure components based on the one or more fields describing the first conditions of the infrastructure components.

25. A method according to claim 16 comprising limiting the number of infrastructure components associated with each of the groups to be less than a maximum number.

26. A method according to claim 16 wherein the one or more representative values comprise a range of values and computing an estimated future physical condition based on the one or more representative values associated with the first group comprises computing an estimated future physical condition based on a midpoint of the range of values.

27. A method according to claim 16 comprising, by the one or more data processors, for each of the plurality of groups, computing an estimated future physical condition based on the one or more representative values associated with the group; and, by the one or more data processors, assigning the estimated future physical condition to all of the infrastructure components in the group.

28. A method according to claim 27 wherein the estimated future physical condition comprises a first future condition corresponding to a first time and wherein the method comprises, by the one or more data processors, for the first group, computing a second estimated future physical condition based on the one or more representative values corresponding to a second time; and wherein the method further comprises, by the one or more data processors, assigning the second future physical condition to all of the objects in the first group.

29. A method according to claim 1 wherein the current physical conditions of the infrastructure components are based at least in part on physical measurements of the component or evaluations of the condition of the component based upon inspections by technical personnel.

30. An infrastructure management system comprising:
one or more data processors;
an inventory database comprising a non-transitory data store storing information identifying infrastructure components of an infrastructure, the stored information including current physical condition information indicative of current physical conditions of the infrastructure components, the current physical conditions each indicating a current degree of deterioration of the corresponding infrastructure component;
a classifier implemented on the one or more data processors and in communication with the inventory database, and configured to sort, by the one or more data processors, the infrastructure components into a plurality of groups based on the current physical condition information for the infrastructure components such that those of the infrastructure components in any one of the groups have current physical condition information satisfying one or more similarity criteria associated with the group;
a future condition determining unit Implemented on the one or more data processors and comprising one or more deterioration models for modeling changes of condition of the infrastructure components over time, each group being associated with one of the one or more deterioration models, the future condition determining unit configured to determine, by the one or more data processors, a time series of predicted future physical conditions for each of the groups based on the deterioration model associated with the group and a representative condition value associated with the group, the representative condition value representative of the current physical conditions of the infrastructure components belonging to the group, and the predicted future physical conditions each comprising a value indicating an estimated degree of deterioration of the infrastructure components of the group at a corresponding one of a plurality of future times which constitute the time series;
an optimizer configured to optimize, by the one or more data processors, a schedule of projects based at least in part on the predicted future physical conditions and one or more constraints, each project associated with one of the groups and comprising at least one of: replacing, upgrading and refurbishing each of the infrastructure components of the group.

31. An infrastructure management system according to claim 30 wherein the classifier is operative to sort the infrastructure components into the groups at least in part by comparing values indicative of severity of consequences of failure of the infrastructure components to severity ranges wherein one of the severity ranges is associated with each of the groups.

* * * * *